United States Patent [19]

Arenal et al.

[11] Patent Number: 4,884,878

[45] Date of Patent: Dec. 5, 1989

[54] ZOOM OPTICAL UNIT

[75] Inventors: Mark G. Arenal, Laguna Nigel; Robert A. Murphy, Lakewood, both of Calif.

[73] Assignee: Ram Optical Instrumentation, Inc., Huntington Beach, Calif.

[21] Appl. No.: 931,264

[22] Filed: Nov. 17, 1986

[51] Int. Cl.⁴ .............................................. G02B 15/00
[52] U.S. Cl. ................................... 350/429; 350/255; 350/531; 33/559
[58] Field of Search ............... 350/429, 255, 511, 529, 350/531, 507; 33/559, 503, 561; 356/244, 246; 354/195.12

[56] References Cited

U.S. PATENT DOCUMENTS

| | | | |
|---|---|---|---|
| 3,286,353 | 11/1966 | Potter | 33/559 |
| 3,508,806 | 4/1970 | Hall | 350/531 |
| 4,155,173 | 5/1979 | Sprandel | 33/559 |
| 4,235,509 | 11/1980 | Takabayashi | 350/429 |
| 4,677,755 | 7/1987 | Iwano et al. | 33/503 |

Primary Examiner—Bruce Y. Arnold
Assistant Examiner—Loha Ben

Attorney, Agent, or Firm—Santa Ana, CA 92701; Plante Strauss Vanderburg & Connors

[57] ABSTRACT

There is disclosed an optical unit which is primarily intended to retrofit existing work piece processing machines such as coordinate measuring machines, milling machines or EDM machines. The optical unit includes a zoom lens with a lens housing, and an optical coupling for a video camera. The lens housing isolates the optical elements against vibration during adjustment of the zoom lens, and for this purpose a flexible belt link is provided between a lens focusing knob and the zoom lens. An optical coupling having a relay or copying lens and an extender lens is included between the video camera and the zoom lens. This coupling effectively decrease the back focal length of the high magnification zoom lens and greatly compress the overall assembly. The optical coupling includes a coupling housing having a focusing cylinder that rotatably adjusts the position of the relay lens. The focusing cylinder has a base ring which is fixedly secured to the base unit of the assembly by mounting screws that are received in substantially larger through bores, thereby permitting shifting of the center line of the coupling assembly, compensating for any imperfections in alignment of the camera or zoom lens.

22 Claims, 4 Drawing Sheets

U.S. Patent    Dec. 5, 1989    Sheet 1 of 4    4,884,878
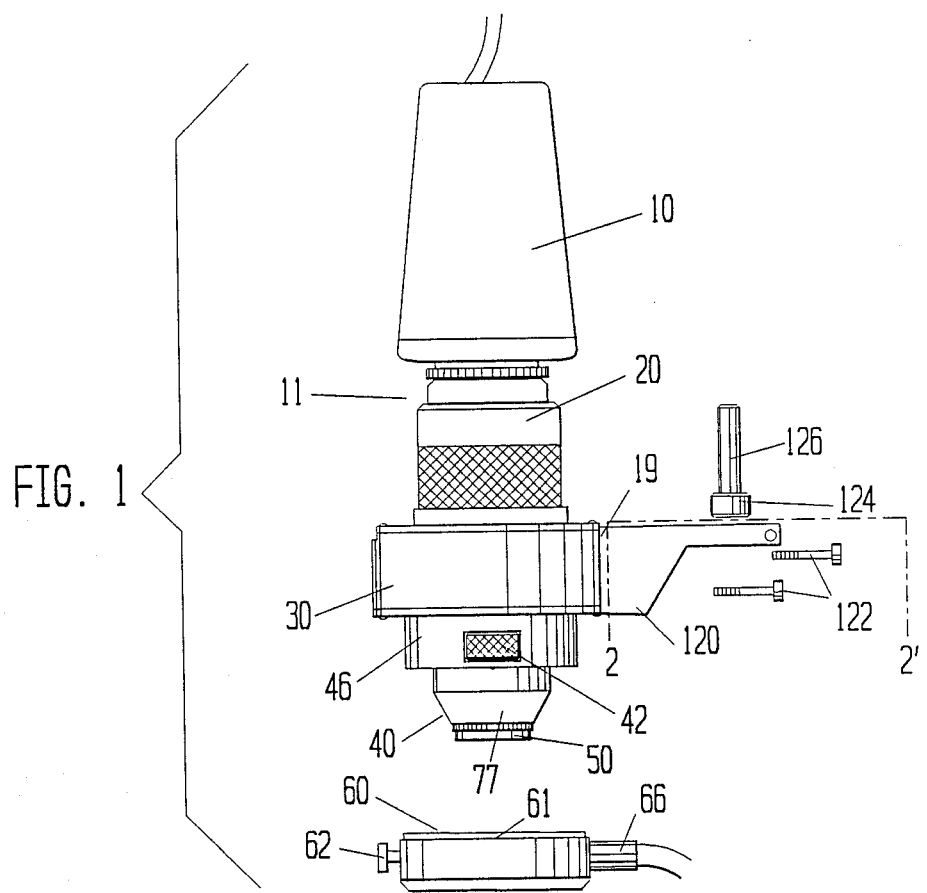
FIG. 1
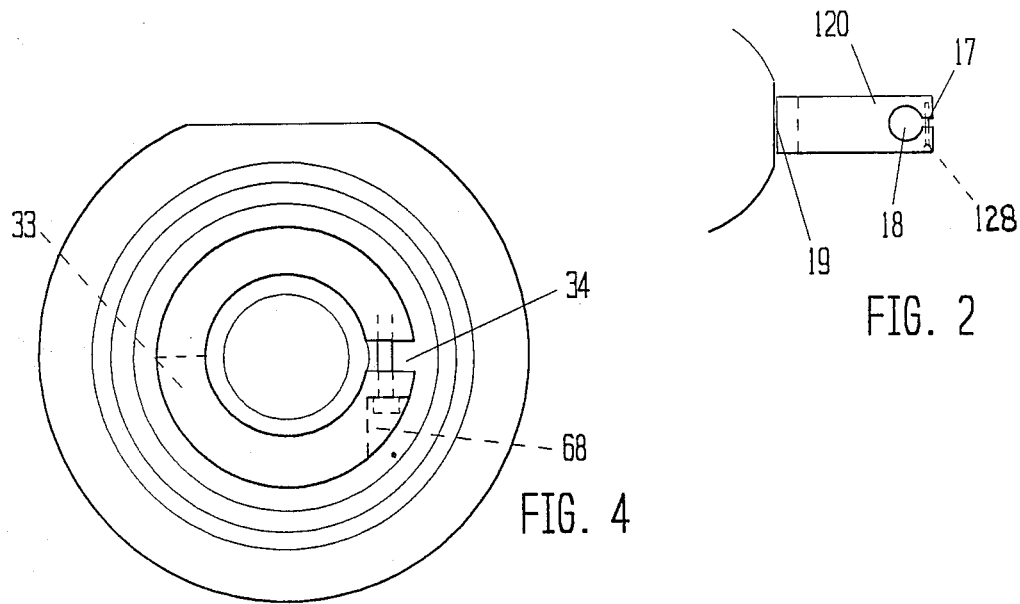
FIG. 2
FIG. 4

ZOOM OPTICAL UNIT

BACKGROUND OF THE INVENTION

1. Field of the Invention

This invention relates to an optical unit for high magnification observation of a work piece, and in particular to an optical unit particularly adapted for use with an electronic, video camera.

2. Brief Statement of the Prior Art

Precise measurement and inspection equipment has been disclosed and claimed in various patents, including U.S. Pat. Nos. 4,138,823; 4,084,323; and 4,078,314. The aforementioned patents are all directed to probes used in the measuring apparatus for determining the dimensions of the work piece and are particularly intended for use with a coordinate measuring machine.

Some attempts have been made to position closed circuit television cameras on measuring machines and, in particular, attempts have been made to position a standard video camera on coordinate optical measuring machines. A number of difficulties are experienced when attempting to use a video camera in such an application. Often there is insufficient lighting. The mounting for the camera is usually inadequate and the camera is unstably supported. Additionally, the long focal lengths of high magnification lenses, e.g., microscope lenses, compounds the mounting difficulties, rendering the camera very sensitive to instability of the mounting. To date, no compact and readily adaptable video camera mounting has been devised.

BRIEF STATEMENT OF THE INVENTION

This invention comprises an optical unit which includes a zoom lens with a lens housing, and an optical coupling for a video camera which effectively decreases the back focal length of magnification lenses and greatly compress the overall assembly. The lens housing isolates the optical elements against vibration during adjustment of the zoom lens and for this purpose a flexible belt link is provided between the focusing knob and the zoom lens. This mechanical isolation of the zoom lens ensures that the focusing of the lens with the thumb wheel adjustment knob will not displace the lens from the intended field of vision. The lens housing also seals the optical elements against debris and corrosive environments.

The assembly also includes, between the video camera and the zoom lens an optical coupling having a relay or copying lens and an extender lens, which effectively decrease the back focal length of the high magnification zoom lens and greatly compress the overall assembly. The optical coupling includes a coupling housing having a focusing cylinder that rotatably adjusts the position of the relay lens. The focusing cylinder has a base ring which is fixedly secured to the base unit of the assembly by mounting screws that are received in substantially larger through bores, thereby permitting shifting of the center line of the coupling assembly, compensating for any imperfections in alignment of the camera or zoom lens.

BRIEF DESCRIPTION OF THE DRAWINGS

The invention will be described with reference to the drawings of which:

FIG. 1 is an elevational view of the optical unit of the invention shown with an accessory fibre optic ring light;

FIG. 2 is a view along the line 2—2' of FIG. 1;

FIG. 4 is a view along the line 4—4' of FIG. 3;

DESCRIPTION OF THE PREFERRED EMBODIMENT

Figure 3:
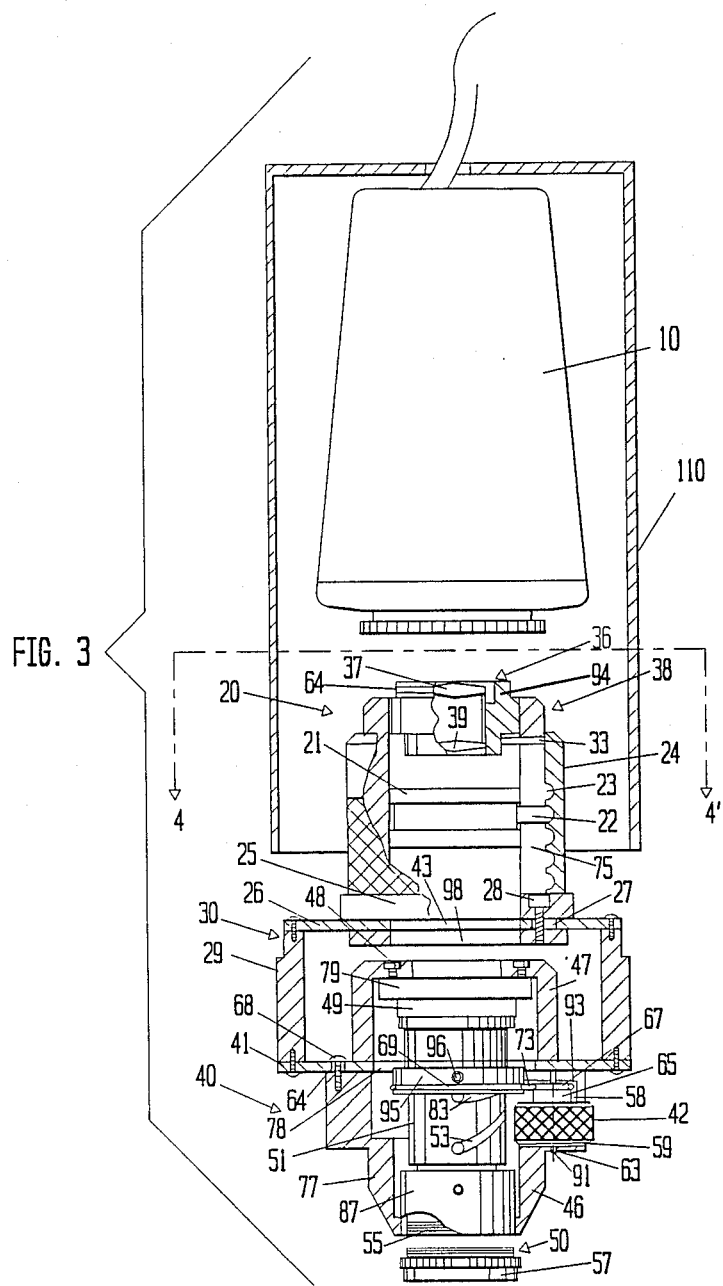
FIG. 3 is an elevational view in partial cross-section of the optical measurement unit of the invention.

Referring now to FIG. 1, the optical unit 11 of the invention is shown as supporting a conventional video camera 10 which is mounted above an optical coupling assembly 20. The optical coupling assembly 20 is fixedly mounted on the bulkhead 30 of the optical unit 11. Bulkhead 30 is a cylindrical body which, preferably has an external flat 19. Attached to the undersurface of bulkhead 30 is the zoom lens subassembly 40 which includes an adjustment thumb wheel 42 that projects through a slot 44 in the sidewall of the isolator sleeve of this subassembly. The isolator sleeve is closed at its undersurface with an optically transparent plate 50 which, preferably, is a magnification lens. Bulkhead 30 and isolator sleeve 46 together form a zoom lens housing.

The optical measurement unit 11 of the invention can be used in combination with an optical illuminator 60, preferably a fiber optic annular illuminator, which is formed with a cylindrical ring 61 that is adapted to fit on the lower cylindrical neck 77 of isolator sleeve and, for this purpose, a plurality of thumb screws 62 are evenly spaced about the periphery of ring 61. The illuminator ring 61 receives a fiber optic cable 66 for discharging a light source directly onto the work piece which would be located beneath the entire assembly.

A mounting bracket 120 is secured to the external flat 19 of bulkhead 30 with fasteners such as socket head machine shoulder screws 122 which engage threaded bores in the side wall of the bulkhead 30. As shown in FIG. 2, the bracket has a distal through bore 18 which receives the cylindrical head 124 of a spindle 126. The through bore is intersected by slot 17 in the end of the bracket, and screw fastener 128 is inserted in a bore which extends past the slot and into a threaded engagement in the end of the bore, to compress the bracket about head 124 of spindle 126, thereby fixedly securing the spindle to the bracket. A series of spindles can be provided with varied diameters and/or lengths to fit any of the various measurement or inspection machines. Each spindle has a head 124 of common size, e.g., about 0.75 inch diameter, to be received in bracket 120.

Referring now to FIG. 3, the invention is illustrated in partial sectional view. As there illustrated, the optical assembly is enclosed within an upper housing 110 which entirely encloses the upper components, i.e., the video camera 10 and extender lens subassembly 36. The video camera 10 is directed toward the extender lens subassembly 36 of the invention, and the upper end of the extender lens subassembly has a threaded neck 64 which is received in the threaded lens receptacle of the camera 10. In the illustration, these elements are in exploded view. The extender lens subassembly includes a focusing cylinder 38 and an upper, meniscus magnification lens 37 and a lower or subjacent, meniscus magnification lens 39. The two lenses 37 and 39 are supported in mounting ring 94 that is clamped in the upper end of the focusing cylinder 38. The upper end of the focusing cylinder 38 has a sector slot 33 which extends approximately 180 degrees about the cylinder. As shown in FIG. 4, the cylinder also has an end slot 34 and is bored at 68 to receive a machine screw 71 which extends through slot 34 which intersects sector slot 33. Screw 71 extends into a threaded bore on the opposite side of slot 34 to permit the upper end of cylinder 38 to be clamped tightly about mounting ring 94.

The focusing cylinder 38 also slidably receives the relay or copying lens 21, which is a conventional assembly of an air space triplet lens in a mounting tube. For a typical installation, a 50 mm lens with a focal value of 2.8 is entirely suitable for this application. The tube of this lens 21 supports a focusing pin 22 that projects radially therefrom through a longitudinal slot 75 in cylinder 38, and is received in a spiral keyway 23 on the inside wall of the focusing sleeve 24. This focusing sleeve 24 is rotatably received about sleeve 38 in the assembly. Cylinder 38 has, at its lower end, a base ring 25 permanently secured thereto. Ring 25 is secured to the cover plate 26 on the bulkhead 30 by assembly screws 28 which extend through larger diameter bores 27 and are threaded into nut ring 98. This mounting arrangement permits for lateral displacement of the coupling subassembly 20 in a manner which permits shifting of its axis relative to the axis of the zoom lens subassembly 40.

The bulkhead 30 is formed with a cylindrical ring 29 having an upper cover plate 26 and lower cover plate 41. The upper cover plate 26 has a central aperture 43 and the lower cover plate has a central aperture 78. Positioned centrally within the bulkhead 30 is an inverted cylindrical cup 47 which receives, against its undersurface, the upper end 49 of the zoom lens subassembly 40. The upper end of the zoom lens has external threads which are received in a central threaded bore in mounting ring 79. The mounting ring 79 is secured permanently to the undersurface of the inverted cup 47 by assembly screws 48.

Zoom lens subassembly 40 is a conventional, variable power magnification lens which has two axially displaceable triplet lenses received within a rotatable barrel 51 having spiral keyways 53 and 83 with different spiral angles. Within the keyway 53 is a key 54 that is permanently secured to the lower triplet lens, whereby rotation of the rotatable barrel 51 displaces this lens axially in the zoom lens subassembly. A similar key is received in keyway 83 for focusing the upper triplet lens.

The lower barrel of the zoom lens subassembly 40 is received in a sleeve 87 which is locked thereto by set screws such as 89. The lower end of sleeve 87 is tightly received in the open end of an isolator sleeve 46 which entirely surrounds the lower end of the zoom lens. Isolation sleeve 46 is secured to the underside of the lower cover 41 of the bulkhead 30 by machine screws 68 which pass through apertures 64 in the cover and are received in threaded bores in the end of isolator sleeve 46. Preferably, apertures 64 are substantially of greater diameter than screws 68, thereby permitting some adjustable lateral shifting of isolator sleeve 46 on this cover plate 41. The isolator sleeve 46 has a through aperture 55 at its lower end which is preferably provided with internal threads to receive the threaded sleeve 57 which carries an optically transparent closure member, preferably a magnification lens 50. In this fashion, any of a number of magnification lenses can be interchanged on the lower end of the isolator sleeve 46, thus sealing the entire lens assembly against intrusion of foreign matter and corrosive agents, and providing increased magnification.

The interior sidewall of isolator sleeve 46 is preferably milled or broached to provide a lateral disposed cavity 58 and this cavity is provided with a through slot 59. A thumb wheel 42 is rotatably mounted on a stationary dowel pin 63 that extends transversely across the cylindrical cavity 58 in the sidewall of the isolator sleeve 46. The dowel pin 63 is press fitted into lapped bores 91 and 93 in the sidewall of isolator sleeve 46 so that there is no lateral displacement of this pin when the thumb wheel is rotated. The thumb wheel has an integral stub shaft 65 which has an arcuate groove 67, forming a drive pulley, that is in juxtaposition to a similar arcuate groove 69 on zoon lens pulley 95 which is secured to the barrel 51 of the zoom lens assembly by set screws such as 96. An elastic drive belt 73 is extended between these members to provide a frictional drive engagement between the thumb wheel 42 and the barrel 51 of the zoom lens. The mounting of the focusing thumb wheel in the rigidly mounted isolator sleeve 46 isolates the zoom lens from any lateral movement by the operator when it is focused on the object. Also the elastic belt 73 functions as a clutch, and slips when the keys of the zoom lens reach their maximum travel in their respective keyways, preventing damage to the zoom lens. In this fashion, the zoom lens is entirely isolated from contact by the operator and is not jostled or displaced during focusing, thereby greatly facilitating the measurement of the work piece.

As previously mentioned, the isolator sleeve 46 is preferably provided with a reduced diameter neck 77 which has a diameter that can be received within the illuminator ring 60 illustrated in FIG. 1. In this fashion, the illuminator ring can be removably secured to the end of the measurement unit 11 to provide optimum illumination of the work piece.

Figure 5:
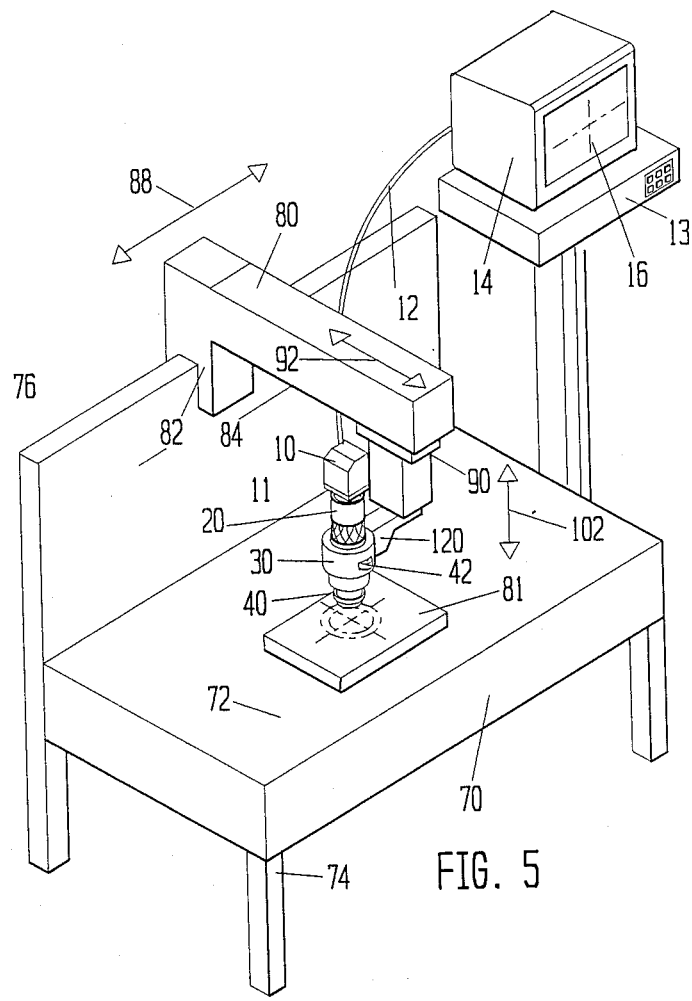
FIG. 5 illustrates the optical unit on a coordinate measuring machine.

Referring now to FIG. 5, the invention is shown in combination with a conventional coordinate measurement inspection machine 70. The coordinate measurement machine 70 has a work table 72 supported on corner legs 74 and has a lateral track 76 which extends coextensively with the lateral span of the work table 72. The work piece is placed upon the top surface of work table 72. Mounted on track 76 is a movable arm 80 which can be driven by a drive motor and gear train (not shown) which are enclosed within the arm 80. The arm 80 is thereby moveable along the direction indicated by the double arrowhead line 88. The arm 80 has an upright standard 82 with an arm 84 that projects, orthogonally to the track 76. Arm 84 also supports a track, (not shown) on which is slidably mounted the measuring carriage 90. The carriage 90 is mounted for sliding movement along the direction indicated by double arrowhead line 92 and, for this purpose, a suitable motor drive or actuator mechanism (not shown) is included in the assembly. Carriage 90 has a vertical beam 100 which is mounted for vertical movement, as shown by the double arrowhead line 102. Again, the carriage 90 contains a suitable drive means such as an electrical or hydraulic drive motor (not shown) for raising and lowering vertical beam 100.

The optical unit 11 of the invention is mounted to the vertical beam 100. The spindle 126 (see FIG. 1) is received in a fixture mounting bore which is provided in the end of beam 100. The video camera 10 is supported in the assembly with its cable 12 extending to a remote television monitor 14. In this illustration, the upper housing 110 is not included. This housing is removable and, can optionally be omitted in any application, as desired. The optical coupling assembly 20, bulkhead 30 and zoom lens subassembly 40 are all coaxially supported in the assembly and oriented toward the position of the work piece which is to be measured. The monitor 14 displays a cross-hair 16 which is electronically generated, and the position of this cross-hair can be precisely located in the center of the monitor.

Figure 6:
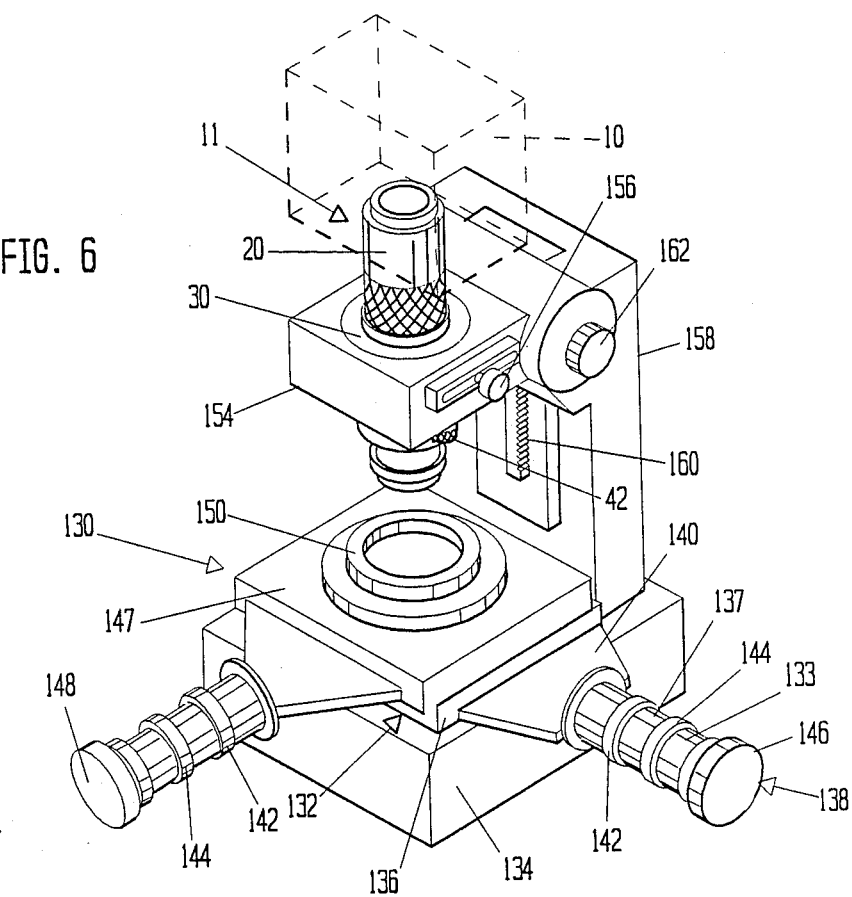
FIG. 6 illustrates the optical unit on a tool maker's microscope.

Referring now to FIG. 6, the optical unit 11 of the invention is shown mounted on a tool maker's microscope 130. The microscope has a table 132 mounted on base 134 for movement in the X and Y axes. Plate 136 of table 132 is mounted on the base 134 for sliding movement along the axis of caliper adjustment assembly 138. This plate 136 has a dependent bracket 140 which supports the caliper adjustment assembly 138 that includes a coarse movement adjustment wheel 142 and a vernier adjustment wheel 144 with a knob 146 to lock the position of the table plate 136. Scales 137 are marked on the sleeves 135 and 133 of the assembly 138.

The top plate 147 of the table 132 is mounted for sliding movement on plate 136 along the axis of its respective caliper adjustment assembly 148, which is mounted at right angles to assembly 138. This assembly has an identical coarse adjustment wheel 142 and vernier adjustment wheel 144. A work clamp or vise 150 is mounted on the top plate 147 to secure a workpiece.

The bulkhead 30 of the optical unit 11 is received in mounting block 154 and secured thereto by lock screw 156. Block 154 is secured in a carriage which is mounted for vertical movement on standard 158. For this purpose, a rack 160 is secured on standard 158 and engaged by a pinion gear (not shown) within the carriage. The pinion is rotationally linked to knob 162 whereby the vertical displacement of the carriage can be controlled.

The optical unit 11 is identical to that previously described with reference to FIGS. 1, 2 and 3, and has the zoom adjustment knob 42 accessible beneath the carriage. The television camera 10 is shown in phantom lines, mounted on the coupling assembly 20.

Figure 7:
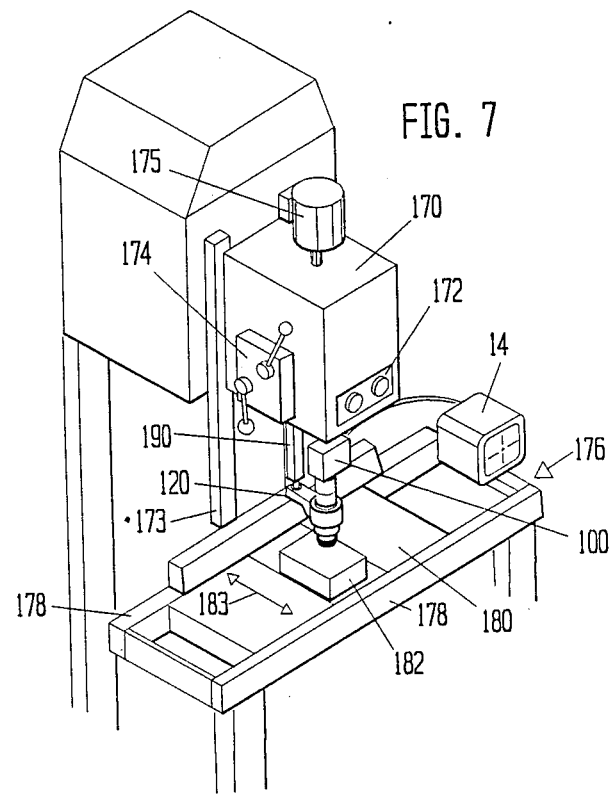
FIG. 7 illustrates the optical unit on a milling machine.

Referring now to FIG. 7, the invention is shown in an application to a conventional milling machine. The milling machine has a head 170 with control panels 172 and 174, and with a tool chuck (not shown) directly beneath the head 170. The head 170 is mounted on vertical tracks 173 and 175 for vertical movement. Directly beneath the head 170 is a table 176 which provides for movement in two horizontal and orthogonal axes, i.e., a X-Y table. The table 176 has longitudinal ways 178 on which is slidably mounted work bed 180 which supports a smaller table or vise (generally shown at 182) that permits a controlled movement of the workpiece in the directions shown by arrowhead line 183.

The optical unit 11 of the invention is mounted on a vertical arm 190 which extends downwardly from head 170, with mounting bracket 120. The television camera 10 is mounted on the optical coupling assembly 20, and its cable extends to the monitor 14, which is placed on a suitable stationary support adjacent the milling machine.

FIGS. 6 and 7 depict applications of the optical unit to small industrial tools such as a tool maker's microscope, and to industrial machines such as milling machines. Both of these applications show the optical unit mounted on a vertically displaceable carriage above a X-Y table. Many other similar applications to other industrial tools and precision measuring instruments are possible, as the optical unit is extremely compact so that it can be mounted in close quarters and/or to small precision instruments such as a microscope.

The calibration of the optical unit will be described with reference to FIG. 5, it being understood, however, that this method is applicable to any installation. Referring to FIG. 5, the optical unit is calibrated by placing a target object 81 on work table 72 and the screws 28 (see FIG. 3) are loosened and coupling assembly 20 is shifted, as necessary, to center the target with the cross-hairs on the monitor. The zoom lens is then run through its magnification range, while observing the target on the monitor, and if the target drifts from alignment with the cross-hairs in the monitor, the coupling assembly is again shifted until the target remains centered throughout the entire magnification range. In this manner, the axis of the coupling assembly can be shifted in the optical unit to adjust for any irregularities in the zoom lens or its mounting. In some applications, the upper half of the optical unit cannot be moved, after the unit has been mounted to a supporting machine. In those applications, the calibrating adjustment can be made by loosening screws 68 (see FIG. 3) and shifting the coupling subassembly 20, thereby laterally moving the zoom lens in the assembly.

In any installation, the selected areas of the work piece can be inspected or measured, or the work piece can be precisely positioned with the optical unit. The x and y axis dimensions can be obtained with observation of the work piece relative to the cross hairs in the monitor. The optical unit can also be used for measurements in the z axis, as it has a very shallow depth of field. To illustrate, at a magnification of 250 times, the depth of field is only 0.0002 inch. The optical unit can thus be set and focused at a predetermined vertical position to provide a zero reference plane, and then moved vertically to refocus to a new level on the work piece, and the distance of vertical movement can be observed to measure the vertical distance between the zero reference plane and the new level.

The magnification lenses which can be used with the optical unit can provide any desired magnification range up to about 600 times magnification. A typical embodiment would use a magnification zoom lens having up to 125 times magnification, which can be coupled with magnification lens covers (sleeve 57) of varied power, e.g., 1.5 and 2.0 magnifications. With these auxiliary lenses, the unit would provide 187 and 250 times magnification, respectively. The resolutions of the optical unit would be 0.0002 inch without auxiliary magnification lenses, and 0.0001 and 0.00005 inch, respectively, with the 1.5 and 2.0 auxiliary magnification lenses.

The invention has been illustrated with reference to a coordinate measurement inspection machine. It can be readily secured to any coordinate (x,y or z axis) machine used for inspection measuring, or positioning of work pieces. Examples of other machines which can be retrofitted with the optical unit are milling machines or electric discharge machines. In this manner, a milling machine or an EDM machine can be converted into an x,y,z non-contact measuring machine for measuring precise and intricate detail of the work piece at very high magnification values.

The invention has been described with reference to the illustrated and presently preferred embodiment. It is not intended that the invention be unduly limited by this disclosure of this presently preferred and illustrated embodiment. Instead, it is intended that the invention be defined by the means, and their obvious equivalents, set forth in the following claims.

What is claimed is:

1. An optical unit for use with an optics receiving and processing unit which comprises:
   a. a zoom lens housing;
   b. a zoom lens with its upper end fixedly secured within said zoom lens housing and having a rotatable barrel for adjustment of its magnification power;
   c. a zoom lens pulley surrounding said rotatable barrel of said zoom lens and fixedly secured thereto;
   d. a thumb wheel carried on a stub shaft rotatably mounted at a lateral location of said rotatable barrel within said zoom lens housing and beside said zoom lens pulley; and
   e. elastic belt means rotatably linking said stub shaft and said zoom lens pulley;
   whereby the magnification power of said zoom lens may be varied by movement of said thumb wheel without dislocating the position of said zoom lens in said assembly.

2. The optical unit of claim 1, wherein said zoom lens is entirely contained within said zoom lens housing.

3. The optical unit of claim 2, wherein said zoom lens housing includes a cylindrical bulkhead with upper and lower end plates, and also includes an isolator sleeve secured to the underside of said lower end plate and surrounding said zoom lens.

4. The optical unit of claim 3 including a slot in the sidewall of said isolator sleeve with a bore transverse thereto in the sidewall of said isolator sleeve and receiving said stub shaft to rotatably support said thumb wheel in said slot.

5. The optical unit of claim 3, wherein said cylindrical bulkhead receives an inverted cylindrical cup and the upper end of said zoom lens is fixedly secured to an undersurface of said cylindrical cup.

6. The optical unit of claim 3 including an optically transparent closure plate removably secured to the lower end of said isolator sleeve, thereby entirely enclosing said zoom lens.

7. The optical unit of claim 6 wherein said optically transparent closure plate includes a magnification lens.

8. The combination of a work piece processing machine having a work table with a first mounting track coextensive with its length, a carriage slidably mounted on said first coextensive mounting track and supporting a second mounting track orthogonal to the first track and coextensive with the width of said table, and a tracking head carriage slidably mounted thereon, and supporting a vertical track, with the optical unit of claim 1 slidably mounted for vertical displacement on said vertical mounting track.

9. The combination of claim 8 wherein said optical unit includes a television camera.

10. The combination of claim 8 wherein said work processing machine is a coordinate measuring machine.

11. The combination of a work piece processing machine having a work table support with a first mounting track coextensive with its length, a work table slidably mounted on said first coextensive mounting track and supporting a second, mounting track orthogonal to the first track and coextensive with the width of said work table, with a work piece carriage slidably mounted on said second track, a vertical standard extending from said support and supporting a mounting block over said work piece carriage with the optical unit of claim 1 mounted to said mounting block.

12. The combination of claim 11 wherein said mounting block is received on said vertical standard for vertical displacement thereon.

13. The combination of claim 11 wherein said work processing machine is a milling machine.

14. The combination of claim 11 wherein said work processing machine is an electrical discharge machine.

15. An optical receiving and processing unit for use with a coordinate measuring machine which comprises:
   a. a video camera;
   b. a coupling housing on the upper end of which is supported said video camera;
   c. a coupling lens assembly, within said coupling housing, which includes:
      i. at least one extender lens fixedly secured on the upper end of said coupling housing;
      ii. a relay lens comprising a triplet lens assembly carried in said coupling housing; and
      iii. adjustment means for varying the axial position of said relay lens in said coupling housing;
   d. a magnification zoom lens with variable means for varying the magnification power of said zoom lens; and
   e. means supporting said magnification zoom lens beneath said coupling housing.

16. The optical receiving and processing unit of claim 15, wherein said means supporting said magnification zoom lens comprises a zoom lens housing having upper and lower end plates with the upper of said end plates positioned beneath said coupling housing.

17. The optical unit of claim 16, wherein said adjustment means includes a focusing cylinder rotatably mounted on said coupling housing and having a spiral keyway on its inside surface, and including a pin projecting from said relay lens assembly into engagement with said spiral keyway.

18. The optical unit of claim 17 including a base ring distally carried on said focusing cylinder with attachment means to fixedly secure said base ring to said upper end plate of said bulkhead.

19. The optical unit of claim 18 including apertures in the upper of said end plates and screw fasteners extending from said base ring and through said apertures and engaging nut means on the undersurface of said upper end plate.

20. The optical unit of claim 18 wherein said apertures have substantially greater diameter than said fasteners, whereby said coupling lens assembly can be laterally adjusted relative to said bulkhead.

21. The optical receiving and processing unit of claim 15, wherein said means supporting said magnification zoom lens comprises a zoom lens housing secured to and beneath said coupling housing.

22. The optical receiving and processing unit of claim 21 wherein said variable means to vary the magnification power of said zoom lens comprises:
   f. a rotatable barrel supporting axially displaceable lenses, and a zoom lens pulley surrounding and fixedly secured to said rotatable barrel;

g. a thumb wheel carried on a stub shaft rotatably mounted at a lateral location of said rotatable barrel with said zoom lens housing and beside said zoom lens pulley; and h. elastic belt means rotatably linking said stub shaft and said zoom lens pulley;

whereby the magnification power of said zoom lens may be varied by movement of said thumb wheel without dislocating the position of said zoom lens in said assembly.

* * * * *